(12) United States Patent
Courtright

(10) Patent No.: US 12,517,022 B1
(45) Date of Patent: Jan. 6, 2026

(54) ULTRAHIGH-THROUGHPUT SMALL PUNCH TESTING

(71) Applicant: United States of America as represented by the Administrator of NASA, Washington, DC (US)

(72) Inventor: Zachary Stephen Courtright, Madison, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 328 days.

(21) Appl. No.: 18/466,643

(22) Filed: Sep. 13, 2023

(51) Int. Cl.
  *G01N 3/08* (2006.01)
  *G01N 3/06* (2006.01)
(52) U.S. Cl.
  CPC .............. *G01N 3/08* (2013.01); *G01N 3/066* (2013.01)
(58) Field of Classification Search
  CPC .................................. G01N 3/08; G01N 3/066
  See application file for complete search history.

(56) References Cited

U.S. PATENT DOCUMENTS

2016/0334315 A1   11/2016   Leroux et al.

FOREIGN PATENT DOCUMENTS

| CN | 202200059 U | 4/2012 |
|---|---|---|
| CN | 202779963 U | 3/2013 |
| CN | 102519803 B | 6/2014 |
| CN | 206756567 U | 12/2017 |
| CN | 109406304 A | 3/2019 |
| CN | 209606249 U | 11/2019 |
| CN | 111060415 A | 4/2020 |
| CN | 217570396 U | * 10/2022 |
| KR | 20200032166 A | 3/2020 |
| WO | WO2008/003948 A | 10/2008 |

OTHER PUBLICATIONS

Courtright, Z.S.; Leclerc,N.P.; Kim, H.N.; Kalidindi, S.R.; "Critical Comparison of Spherical Microindentation, Small Punch Test, and Uniaxial Tensile Testing for Selective LaserMelted Inconel 718"; Appl. Sci. 2021, 11, 1061 https://doi.org/10.3390/app11031061.

(Continued)

*Primary Examiner* — Jonathan M Dunlap
(74) *Attorney, Agent, or Firm* — Jerry L. Seemann; Trenton J. Roche

(57) ABSTRACT

An ultrahigh-throughput small punch testing apparatus that autonomously performs small punch testing (SPT) of small test samples to assess mechanical properties of the test samples. Once loaded with test samples, the testing apparatus advantageously tests many such small test samples (>100) without human intervention. The small punch testing apparatus employs a clamping/punch assembly that advantageously provides pinpoint clamping and punch testing of a test sample without the use of an enclosed fixture. The clamping/punch assembly is driven in a Z-axis direction to clamp a test sample to a die prior to punching. The clamping/punch assembly is advantageously relocatable to other die locations wherein test samples have been pre-positioned thereby providing small punch testing of many (>100) test samples so positioned-without human intervention.

20 Claims, 14 Drawing Sheets

(56) References Cited

OTHER PUBLICATIONS

Di Persio, Franco (2004); "Small punch test for the assessment of hydrogen-damaged and thermally-aged steels for pressurized equipment."; thesis, Swansea University; http://cronfa.swan.ac.uk/Record/cronfa42630.

Lucon, Enrico; Benzing, Jake; Hrabe, Nik; "Development and Validation of Small Punch Testing at NIST"; National Institute of Standards and Technology or Internal Report 8303; Nttl. Inst. Stand. Technol. Interag. Intern. Rep. 8303, Apr. 2020; https://doi.org/10.6028/NIST.IR.8303.

* cited by examiner

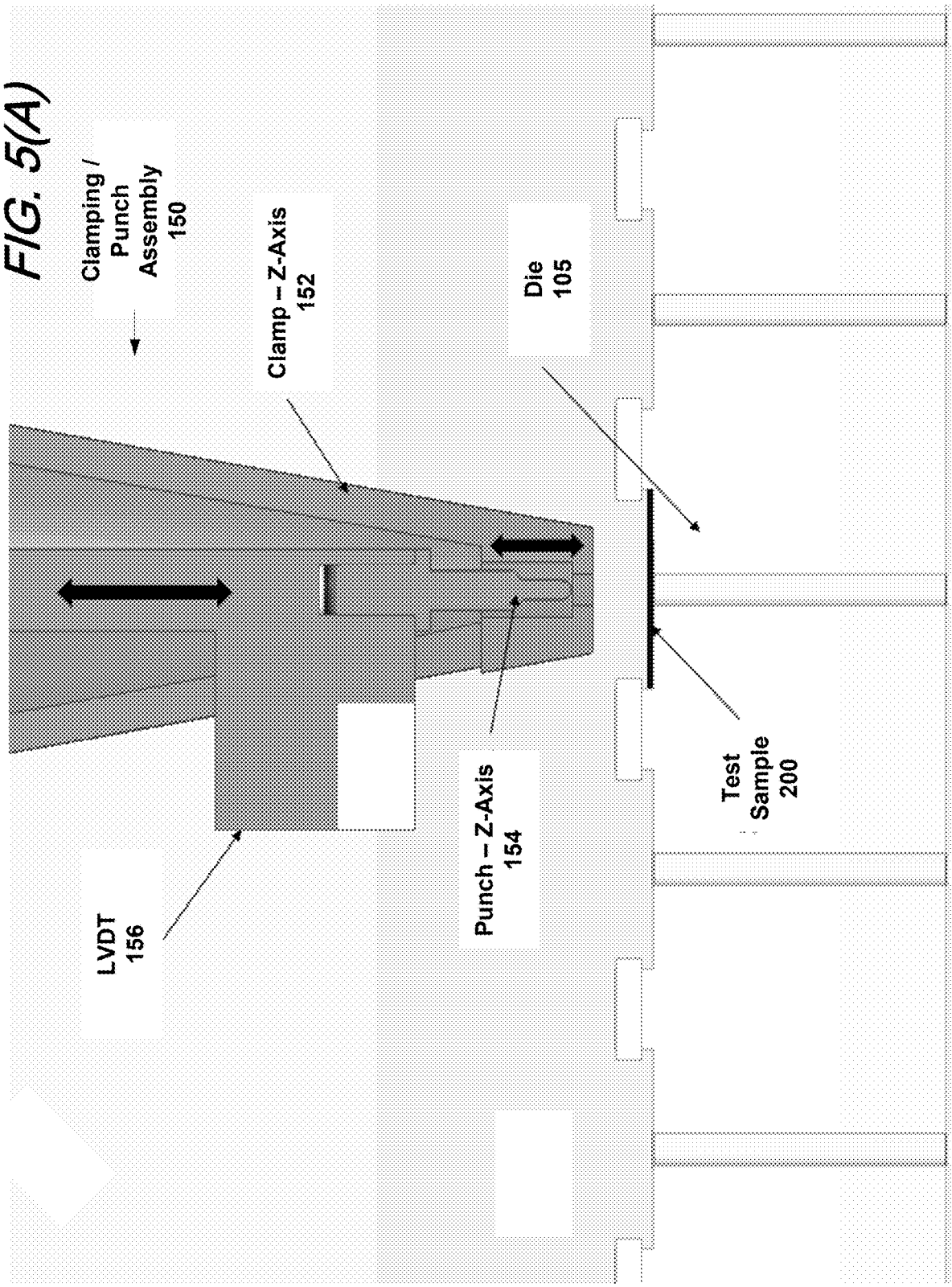

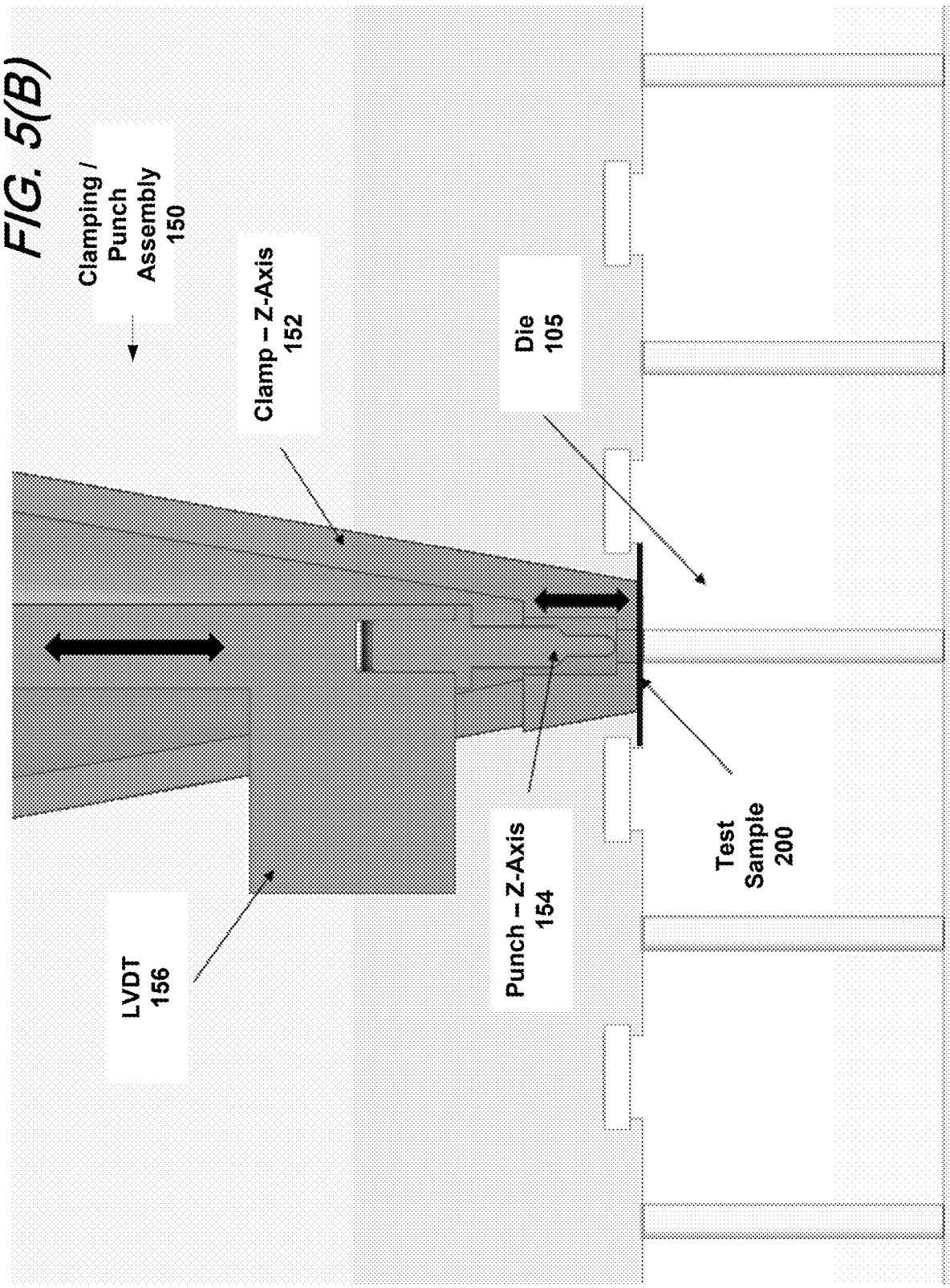

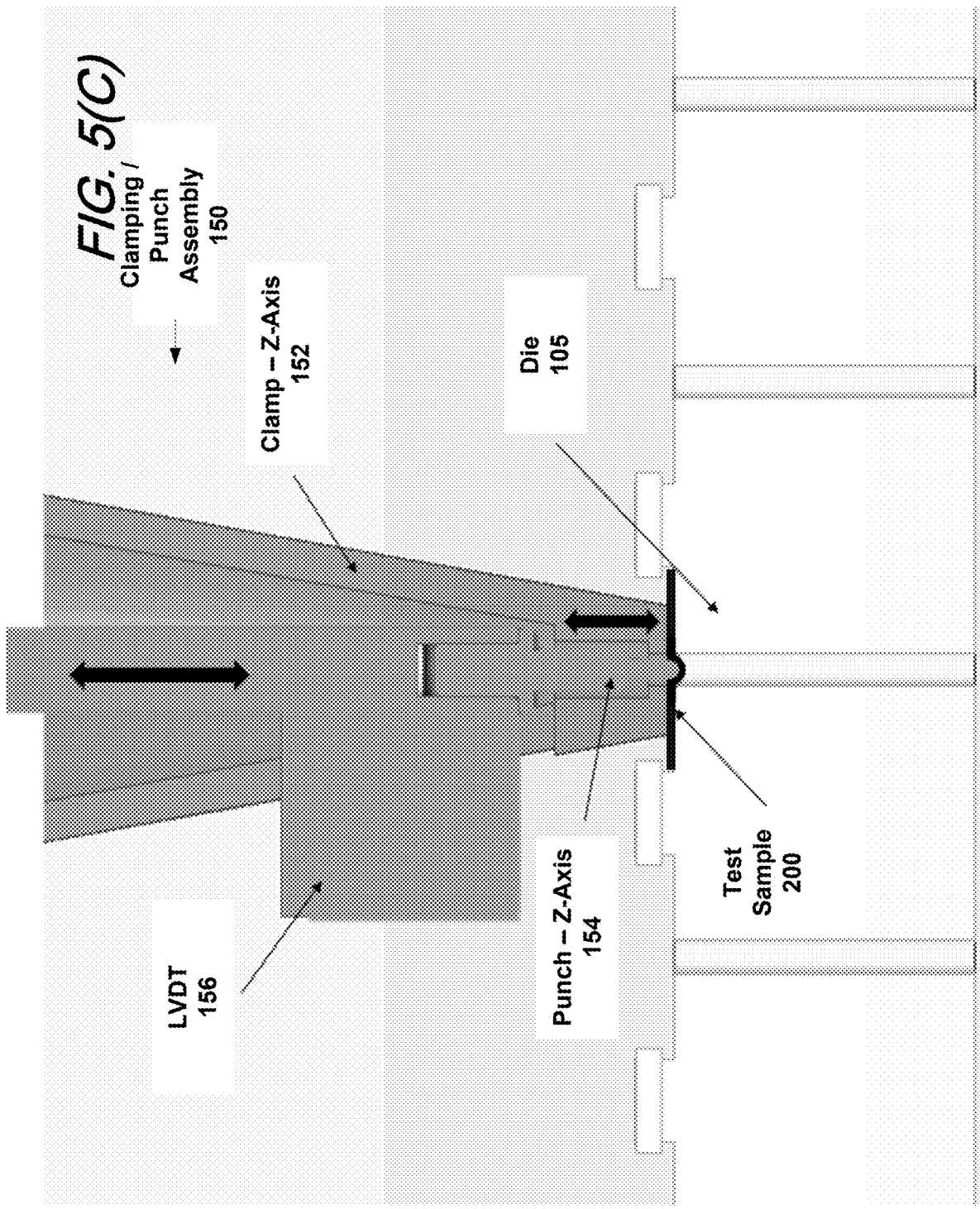

ULTRAHIGH-THROUGHPUT SMALL PUNCH TESTING

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

Mechanical testing of material compositions is critically important to determine the strength, durability, stiffness, and other mechanical properties of the material. Information learned from mechanical testing is essential for the design and manufacture of safe and reliable products. Mechanical testing may also be used to identify the best materials for a particular application.

As those skilled in the art will readily appreciate, there are many reasons why it is so important to mechanically test materials. Some of the most important reasons include the following.

To ensure safety-Mechanical testing can help to identify potential weaknesses in a material that could lead to failure. This information can then be used to design products that are safe, reliable, and meet applicable safety standards.

To improve performance-Mechanical testing can be used to identify ways to improve the performance of a material. This information can be used to develop new materials that are better suited for specific applications.

To reduce costs-Mechanical testing can help to identify materials that are more cost-effective than traditional materials. This information can lead to reduced costs for product manufacturing and operation.

To meet regulatory requirements-Mechanical testing is critically important in industries that are subject to regulations that require the mechanical testing of materials. For example, the aerospace industry has regulations that require the testing of materials used in aircraft.

As a result of its importance, many mechanical testing methodologies have been developed in the art. Among the most common mechanical tests that are performed on materials include the following.

Tensile testing measures the strength of a material in tension. This is the most common type of mechanical testing and is used to determine yield strength, ultimate tensile strength, and elongation of a material.

Compressive testing measures the strength of a material in compression. This test is often used to determine the compressive strength and modulus of elasticity of a material.

Shear testing measures the strength of a material in shear. This test is often used to determine the shear strength and modulus of rigidity of a material.

Bending testing measures the strength of a material in bending. This test is often used to determine the flexural strength, modulus of rupture, and modulus of elasticity of a material.

Hardness testing measures the resistance of a material to permanent deformation. This test is often used to determine the hardness of a material.

Impact testing measures the ability of a material to withstand sudden impact loads. This test is often used to determine the impact strength of a material.

These are just a few of the mechanical tests that can be performed on materials. The specific tests that are performed will vary depending on the material and the application.

Unfortunately, many of these mechanical testing methodologies are cost prohibitive for expensive materials due to the required size of material samples necessary for testing. Additionally, time-consuming, and expensive sample material preparation-including machining of the samples—may be necessary for other types of mechanical testing. Finally, significant human involvement may be necessary to perform mechanical testing, thereby significantly reducing testing throughput.

The small punch test was developed for situations where source material is expensive or difficult to acquire and has even been used for materials having location-dependent material properties. The test correlates deformations/displacements resulting from a concentrated load to mechanical properties of a material. The advantages of such a test make it an attractive option for material evaluation for numerous materials in various industries.

SUMMARY OF THE INVENTION

An advance in the art is made according to aspects of the present disclosure directed to an ultrahigh-throughput small punch testing apparatus and method that autonomously performs small punch testing (SPT) of small test samples to assess mechanical properties. Once loaded with test samples, our inventive ultrahigh-throughput small punch testing apparatus advantageously tests many such small test samples (>100) without human intervention.

In sharp contrast to the prior art, our inventive small punch testing apparatus employs a clamping/punch assembly that advantageously provides pinpoint clamping and punch testing of a test sample without the use of an enclosed fixture. The clamping/punch assembly is driven in a Z-axis (i.e., downward) direction by a Z-drive to clamp a test sample to a die prior to punching. Once clamped, the test sample is punch tested through the effect of a punch included within the clamping/punch assembly that is driven in a Z-axis direction by a test drive that is separate from the Z-drive that operates to produce the clamping. The clamping/punch assembly is advantageously relocatable along an X-Y grid of a die wherein test samples have been pre-positioned thereby providing small punch testing of many (>100) test samples so positioned.

Our inventive small punch testing apparatus eliminates the need for a separate clamping fixture and testing apparatus. Instead, our inventive small punch testing apparatus clamps a test sample to a specified load by the same structure that performs the punch testing. This novel design provides streamlined testing of multiple test samples and permits testing of samples having varied thicknesses, sizes, shapes, and/or material composition. The autonomous operation of our inventive small punch testing apparatus provides unattended operation of all test samples-once all the test samples are loaded. Such autonomous operation of our inventive small punch testing apparatus accelerates material testing and process development.

Operationally, test samples are loaded onto a die. The clamping/punch assembly, which can independently move in three directions (i.e., X, Y, and Z), is located in alignment with one of the loaded test samples, and the clamping/punch assembly is moved downward along the Z-axis until it contacts the sample and reaches a specified clamping load. Then, the punch, located within the clamping/punch assembly, activates, and moves downward toward the sample and performs a test. As noted previously, the downward movement of the clamping/punch assembly is produced by operating a Z-drive, while the punching is produced by operating a separate test drive along the Z-axis. Once the test is complete, the clamping/punch assembly and punch both are retracted, and the clamping/punch assembly is moved to align with the next loaded SPT sample. Positional precision and accuracy are facilitated by encoders on each axis and higher precision punch displacement measurements result from a linear variable differential transformer (LVDT) attached to a side of the punch. Separate load cells are used to measure the load applied by the clamping/punch assembly to clamp the test samples and the load applied by the punching, advantageously providing the ability to achieve, hold and record a given clamping force and then perform a punch test while measuring/recording load data on the punch itself.

BRIEF DESCRIPTION OF THE DRAWING

FIG. 5(A), FIG. 5(B), and FIG. 5(C), are a series of schematic diagrams illustrating clamping/punch assembly operation on a single test sample loaded and positioned on a die in which: FIG. 5(A) shows the clamping/punch assembly positioned above the loaded test sample;

FIG. 5(B) shows the clamping/punch assembly clamping the test sample to the die through the effect of its downward (Z-axis) displacement; and FIG. 5(C) shows the punch operation (Z-axis) of the clamped test sample of our ultrahigh-throughput small punch testing apparatus according to aspects of the present disclosure.

DETAILED DESCRIPTION OF THE INVENTION

Figure 1:
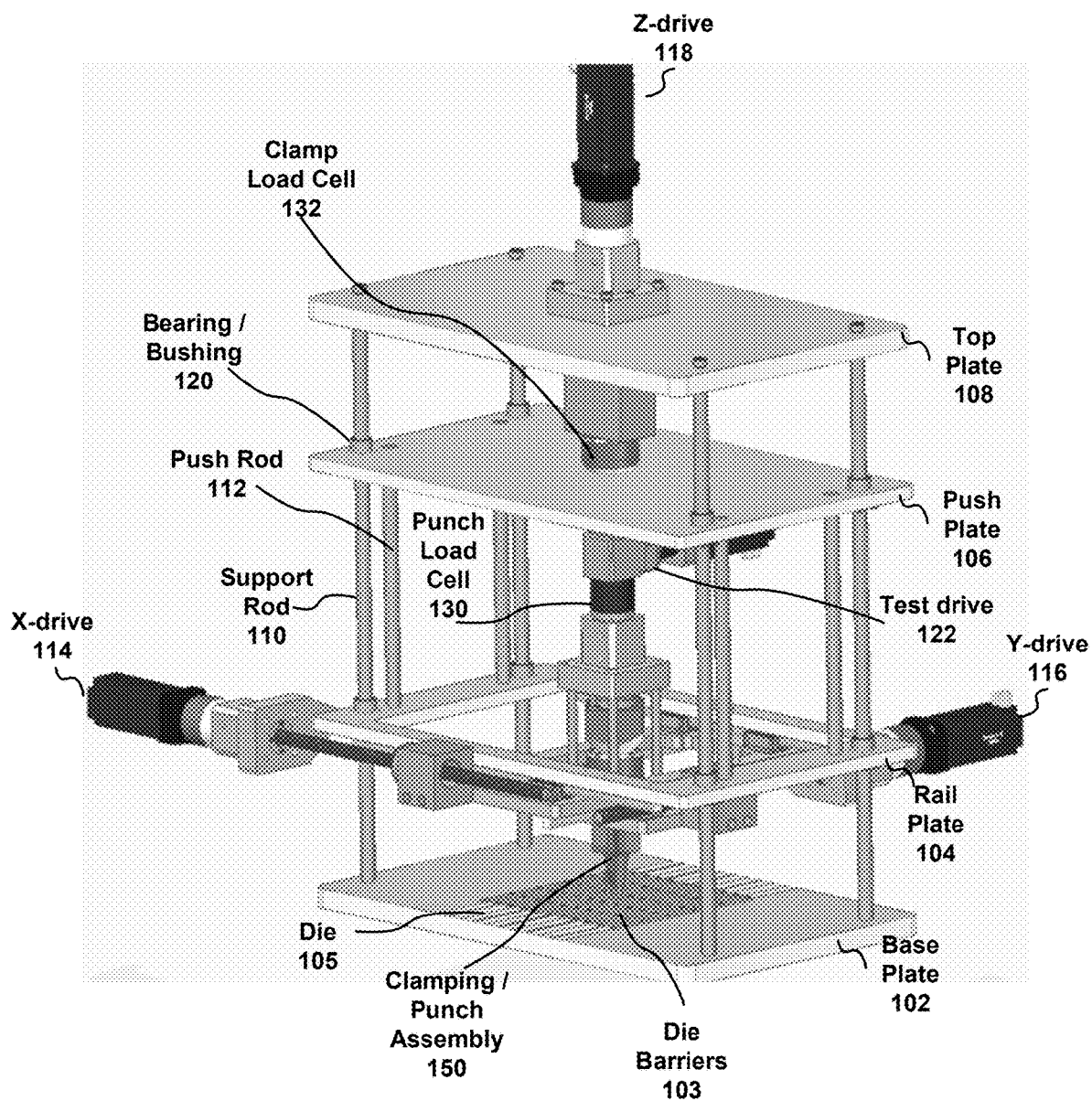
FIG. 1 is a perspective view of an illustrative ultrahigh-throughput small punch testing apparatus according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, small punch testing (SPT) is a material characterization methodology that has been of great interest recently due to its ability to extract mechanical properties using very small samples and as a result is particularly well suited for situations where source material is scarce, costly, or otherwise difficult to acquire. Because SPT employs very small samples, it is not only a good alternative where source material is scarce, but it is also useful in evaluating and tracking the evolution of material properties of a component that has been in service.

The small punch test is designed to subject a test sample to combined bending and stretching. Generally, a representative test configuration includes an upper and a lower die to hold a small, thin test sample and a punch to contact and deform the test sample. The dies and punch are configured to control the punch displacement and measure the load, via a load cell, and a displacement gage is used to accurately measure sample deformation due to deflection, most commonly using an encoder positioned on a displacement driving lead screw or linear variable displacement transducer (LVDT) directly contacting the test sample.

FIG. 1 is a perspective view of an illustrative ultrahigh-throughput small punch testing apparatus according to aspects of the present disclosure. With reference to that figure, it may be observed that the illustrative apparatus includes—from bottom to top-a base plate 102, a rail plate 104, a push plate 106, and a top plate 108. These four plates 102, 104, 106, and 108 are integrated into a frame assembly by support rod(s) 110. As shown, four support rods 110 are employed in this structure such that one end of each individual support rod 110 is attached at a corner of the base plate 102 and the other end of each individual support rod 110 is attached at a corner of the top plate 108. The rail plate 104 and push plate 106 are slidably attached to the support rods 110 at locations along the support rods 110 between the bottom plate 102 and the top plate 108 through the effect of bearings/bushings 120, located at corner positions of the rail plate 104 and push plate 106.

In this illustrative configuration, the slidable attachment of the rail plate 104 and the push plate 106 to the support rods 110 are achieved using bearings/bushings 120 that may be made from any number of materials known in the art that exhibit a sufficient durability and low friction characteristics. Such materials may include soft metals such as brass or self-lubricating polymeric materials including Teflon and nylon. Alternatively, the arrangement of the support rod, rail plate, and push plate may include a linear bearing. Those skilled in the art will understand that a linear bearing is a type of bearing that supports a load of a carriage during its single-axis linear movement along a guide rail and provides a low friction sliding surface.

As further illustrated, push plate 106 and rail plate 104 are attached to one another in a fixed, spaced-apart arrangement by push rods 112. As shown, four push rods 112 are employed in this structure such that one end of each individual push rod 112 is attached near a corner of the rail plate 104 and the other end of each individual push rod 112 is attached near a corner of the push plate 106. As will be understood and appreciated by those skilled in the art, when the rail plate 104 and push plate 106 are attached to one another in this manner, they will collectively slide together along the support rods 110 at a fixed apart distance from one another that fixed distance being the length of the push rods 112.

With continued reference to FIG. 1, shown further is a test drive 122 and clamping/punch assembly 150 that are position-adjustably attached to rail plate 104 by X-drive 114 and Y-drive 116 that provide X and Y position adjustment of the test drive 122 and clamping/punch assembly 150. As will be understood and appreciated, by operating the X-drive 114 and/or or Y-drive 116, the position of the clamping/punch assembly 150 may be relocated over any one of X-Y coordinate positions associated with a die 105 which is located on the base plate 102.

Die 105 is located on base plate 102 and provides many small punch test sample locations at which test samples are located for testing. In an illustrative embodiment, the die 105 arranges the test samples in a rectangular grid at locations which are individually clampable/testable by operating the X-drive 114 and Y-drive 116—as necessary. While a rectangular orientation is convenient and preferable, other arrangements of test samples are within the contemplation of this disclosure so long as the other arrangements permit sufficient clamping/punch assembly clearance for testing.

Die 105 may include several die barriers 103 that maintain test samples in their respective locations on die 105 upon retraction of the clamping/punch assembly 150 after punch testing.

Shown further in FIG. 1, a Z-drive 118 is affixed to the top plate 108. When the Z-drive 118 is operated, the push plate 106 and rail plate 104, together with the X-drive 114, Y-drive 116, test drive 122, and clamping/punch assembly 150, are collectively moved in a Z-direction.

While not specifically shown in this figure, those skilled in the art will understand and appreciate that the specific materials used to construct the apparatus shown in FIG. 1 may include any material itself exhibiting sufficiently desirable mechanical characteristics. For example, plates 102, 104, 106, and 108 may be constructed from steel or aluminum or alloys thereof that meet cost, manufacturing, and availability budgets. Likewise, drive mechanisms 114, 116, and 118 may include stepper/servo motors and controllers and steel lead screws and movable carriages.

With this description of FIG. 1 in place, a simplified, illustrative small punch testing procedure can be presented according to aspects of the present disclosure. Test samples are acquired and positioned on die 105. By driving the X-drive 114 and Y-drive 116, the test drive 122 and clamping/punch assembly 150 are relocated to a position directly above one of the positioned test samples. The Z-drive 118 is then driven to urge the rail plate 104 and clamping/punch assembly 150 down toward the test sample over which the clamping/punch assembly 150 is positioned. The downward force of the clamping/punch assembly 150 is increased until a desired force is achieved as measured by a clamp load cell 132. Then, the test drive 122 is operated causing a punch test operation to be performed between a punch (not specifically shown in this figure) and the test sample overlying die 105. During the punch test operation, punch load cell 130 measures the punching force.

Figure 2:
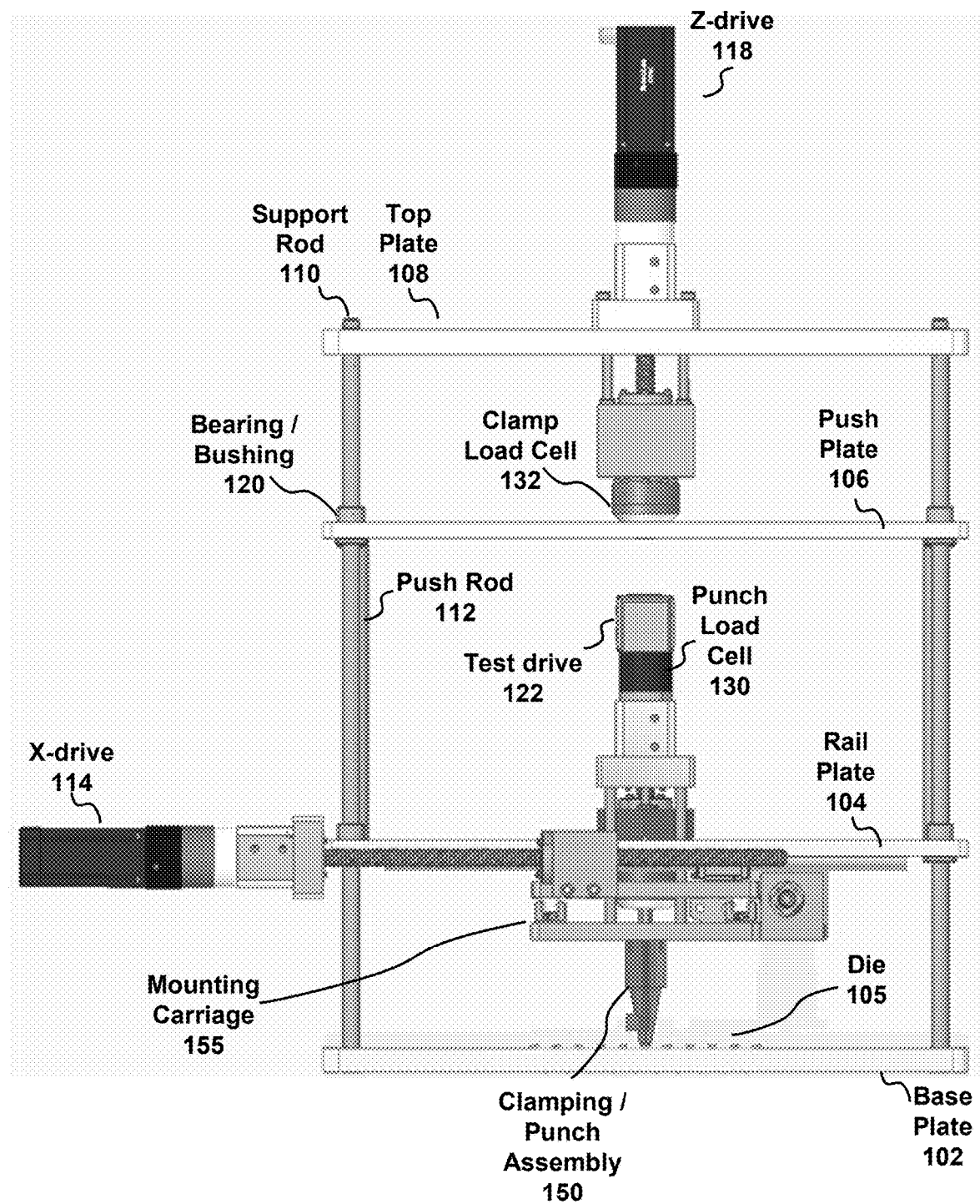
FIG. 2 is a front view of an illustrative ultrahigh-throughput small punch testing apparatus according to aspects of the present disclosure.

FIG. 2 is a front view of an illustrative ultrahigh-throughput small punch testing apparatus according to aspects of the present disclosure. Shown in this front view is the overall structure of our testing apparatus including the base plate 102, rail plate 104, push plate 106, top plate 108, and all interconnected by support rods 110. As noted previously, rail plate 104 and push plate 106 are slidably attached to the support rods 110 by bearings/bushings 120.

As can be understood from this figure, a mounting carriage 155 is slidably connected to the underside of rail plate 104; and test drive 122, punch load cell 130, and clamping/punch assembly 150 are vertically mounted in the mounting carriage 155. X-drive 114, which is connected to rail plate 104, when operated produces a translation in the X-direction of the mounting carriage 155, which in turn, produces a translation in the X-direction of the clamping punch assembly 150. Operation of Z-drive 118 produces translation in the Z-direction by applying a load through the clamp load cell 132 to the push plate 106. The load then transfers to the rail plate 104 via push rods 112 and onto the mounting carriage 155 causing translation of the clamping/punch assembly 150 in the Z-direction. In other words, operation of Z-drive 118 produces a vertical downward, or upward (depending upon the direction of Z-Drive operation), translation of clamping/punch assembly 150. Accordingly, when the clamping/punch assembly 150 is positioned over a test sample and translated in a downward Z-direction by operation of the Z-drive 118, the test sample is clamped/secured to the die 105 positioned on base plate 102. Subsequently, the test drive 122 is operated and the punch is driven downward in the Z-direction thereby impacting the sample and performing a punch test.

Figure 3:
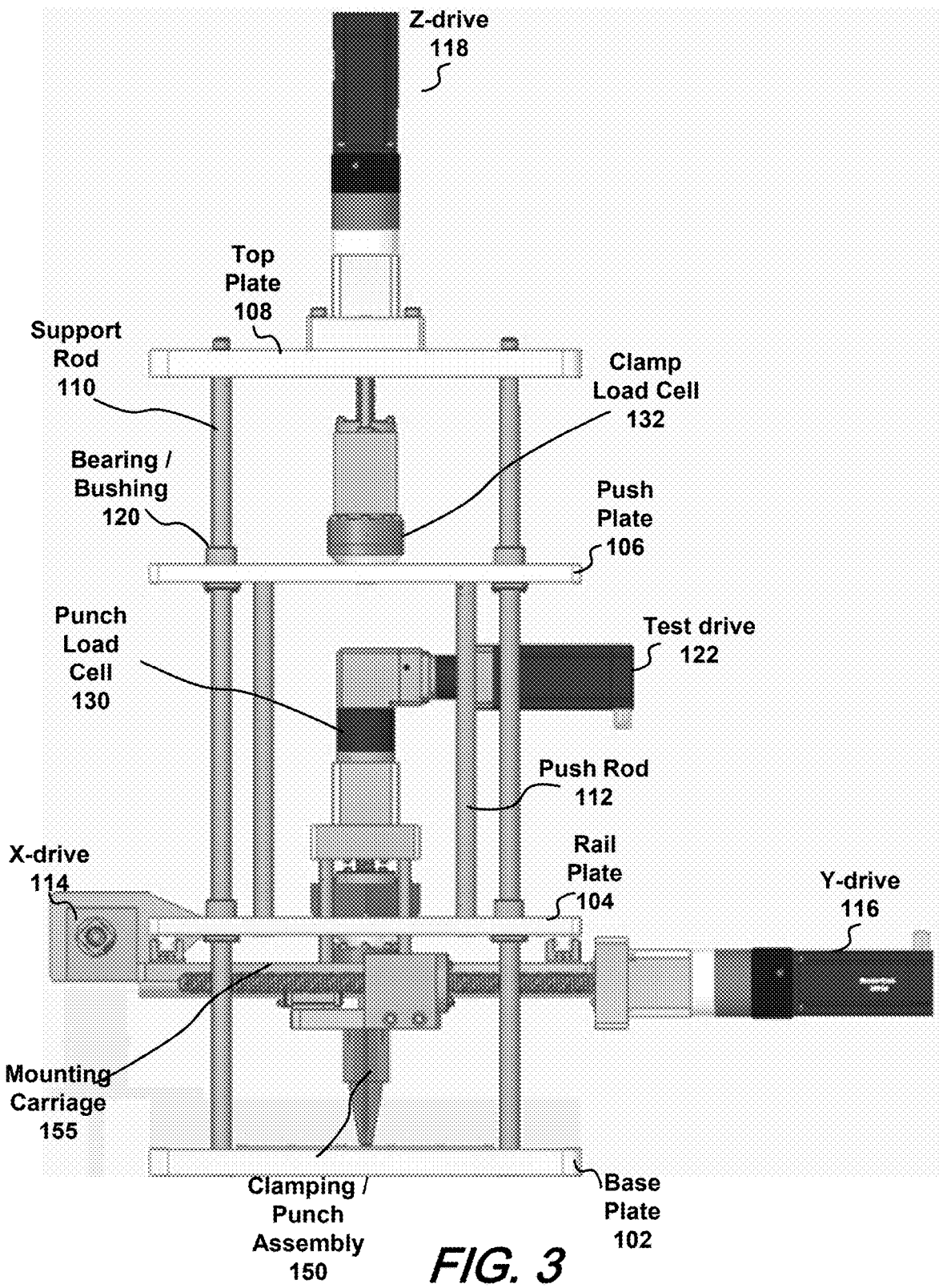
FIG. 3 is a right side-view of an illustrative ultrahigh-throughput small punch testing apparatus according to aspects of the present disclosure.

FIG. 3 is a right side view of an illustrative ultrahigh-throughput small punch testing apparatus according to aspects of the present disclosure. Shown in that side view is the overall structure of the testing apparatus including the base plate 102, rail plate 104, push plate 106, and top plate 108, all interconnected by support rods 110. As noted previously, rail plate 104 and push plate 106 are slidably attached to the support rods 110 by bearings/bushings 120. Push rods 112, provide mechanical connectivity between push plate 106 and rail plate 104, such that both plates and structures attached thereto move vertically, in unison. More clearly shown in this right side view is Y-drive 116 which, when activated, produces a translation of the test drive 122 and the clamping/punch assembly 150, in the Y-direction.

Figure 4:
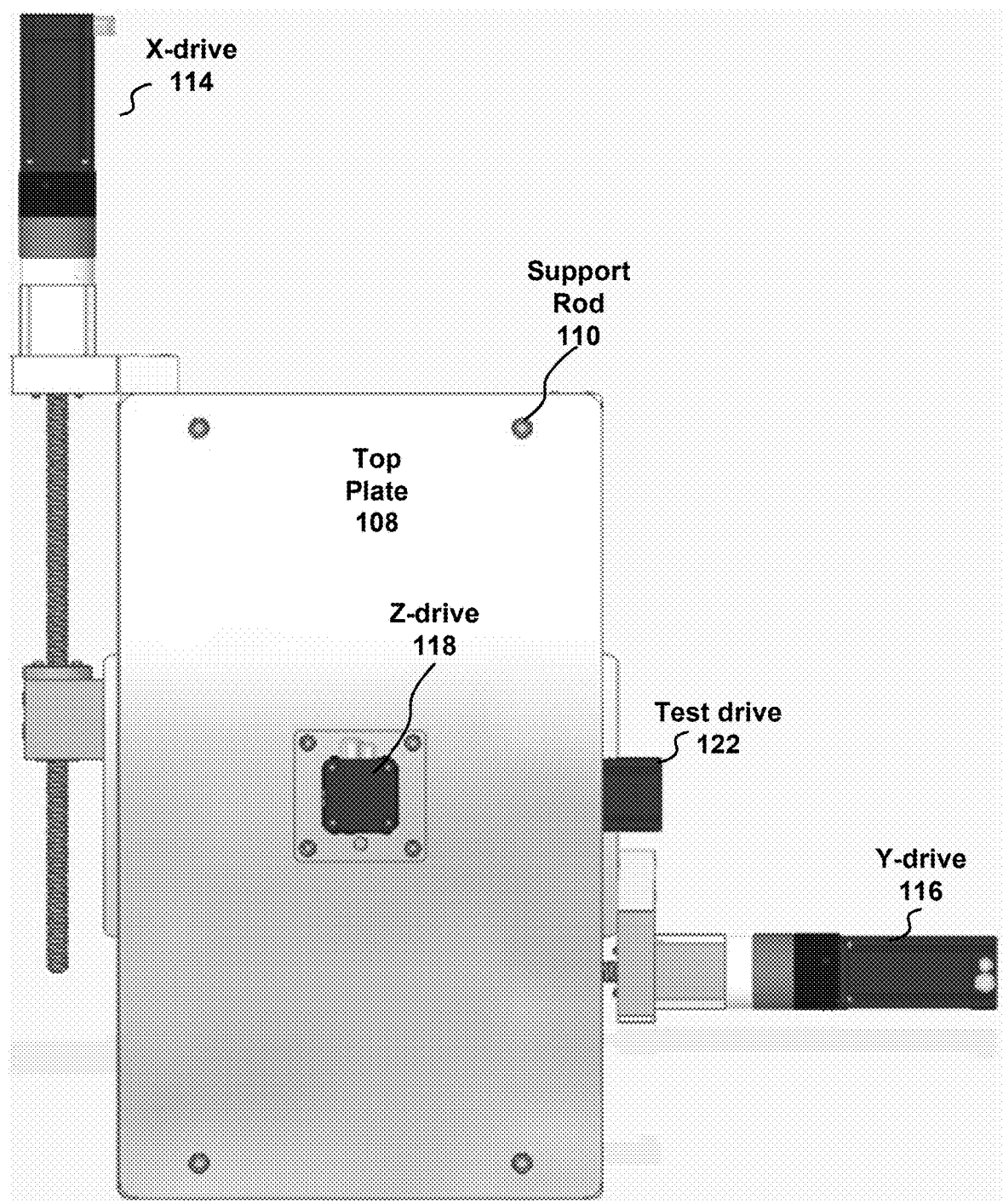
FIG. 4 is a top view of an illustrative ultrahigh-throughput small punch testing apparatus according to aspects of the present disclosure.

FIG. 4 is a top view of an illustrative ultrahigh-throughput small punch testing apparatus according to aspects of the present disclosure. Shown in this top view are top plate 108, support rods 110, X-drive 114, Y-drive 116, Z-drive 118, and test drive 122.

FIG. 5(A), FIG. 5(B), and FIG. 5(C), are a series of schematic diagrams illustrating the operation of the clamping/punch assembly 150 on a single test sample 200 loaded and positioned on die 105 in which: FIG. 5(A) shows the clamping/punch assembly positioned above the loaded test sample; FIG. 5(B) shows the clamping/punch assembly clamping the test sample to the die through the effect of its downward (Z-axis) displacement; and FIG. 5(C) shows the punch operation (Z-axis) of the clamped test sample of our ultrahigh-throughput small punch testing apparatus according to aspects of the present disclosure.

With simultaneous reference to those figures, shown illustratively in FIG. 5(A) is clamping/punch assembly 150 including clamp 152 positioned over a test sample 200 that is positioned on a die 105. As noted previously, the clamping/punch assembly 150 may be relocated over any one of an array of test samples positioned on die 105 by operating X-drive and/or Y-drive (not specifically shown in this figure) respectively. Shown further in this figure is punch 154 that is located within, and in axial alignment with, the clamping/punch assembly 150. While not specifically shown in detail in this figure, those skilled in the art will understand and appreciate that a head/tip of the punch 154 that will contact the sample 200 during operation may be constructed from a sufficiently hard material and be appropriately shaped, i.e., spherical, round, etc., or include a replaceable ball tip.

Shown further in FIG. 5(A) is an LVDT 156 positioned, mounted, and configured to measure linear displacement of the punch 154 and test sample during operation. As those skilled in the art will understand and appreciate, a linear variable differential transformer (LVDT) (also known as a linear variable displacement transformer, linear variable displacement transducer, or simply a differential transformer) is a type of electrical transformer used for measuring linear displacement (position). LVDTs are robust, provide absolute linear position/displacement, are inherently frictionless, and exhibit a nearly infinite life cycle.

FIG. 5(B) shows the clamping/punch assembly 150, clamping the test sample 200 positioned on the die 105 through the effect of its downward (Z-axis) displacement. As schematically illustrated, the clamping/punch assembly 150 has translated downward (Z-axis) to contact the test sample 200 through the effect of the Z-drive 118 (not shown in this figure). The downward clamping force may be measured during operation by a clamp load cell (not specifically shown here) that is part of the test drive.

FIG. 5(C) shows the punch operation (Z-axis) of the clamped test sample 200. As shown in this figure, punch 154 is shown displaced downward along the Z-axis through the effect of the test drive (not specifically shown). As a result of the downward displacement of the punch 154, the sample 200 is contacted and urged toward the die 105 such that a test measurement of the test sample 200 is obtained. The amount of displacement produced in the test sample 200 may advantageously be measured by LVDT 156.

Figure 6A:
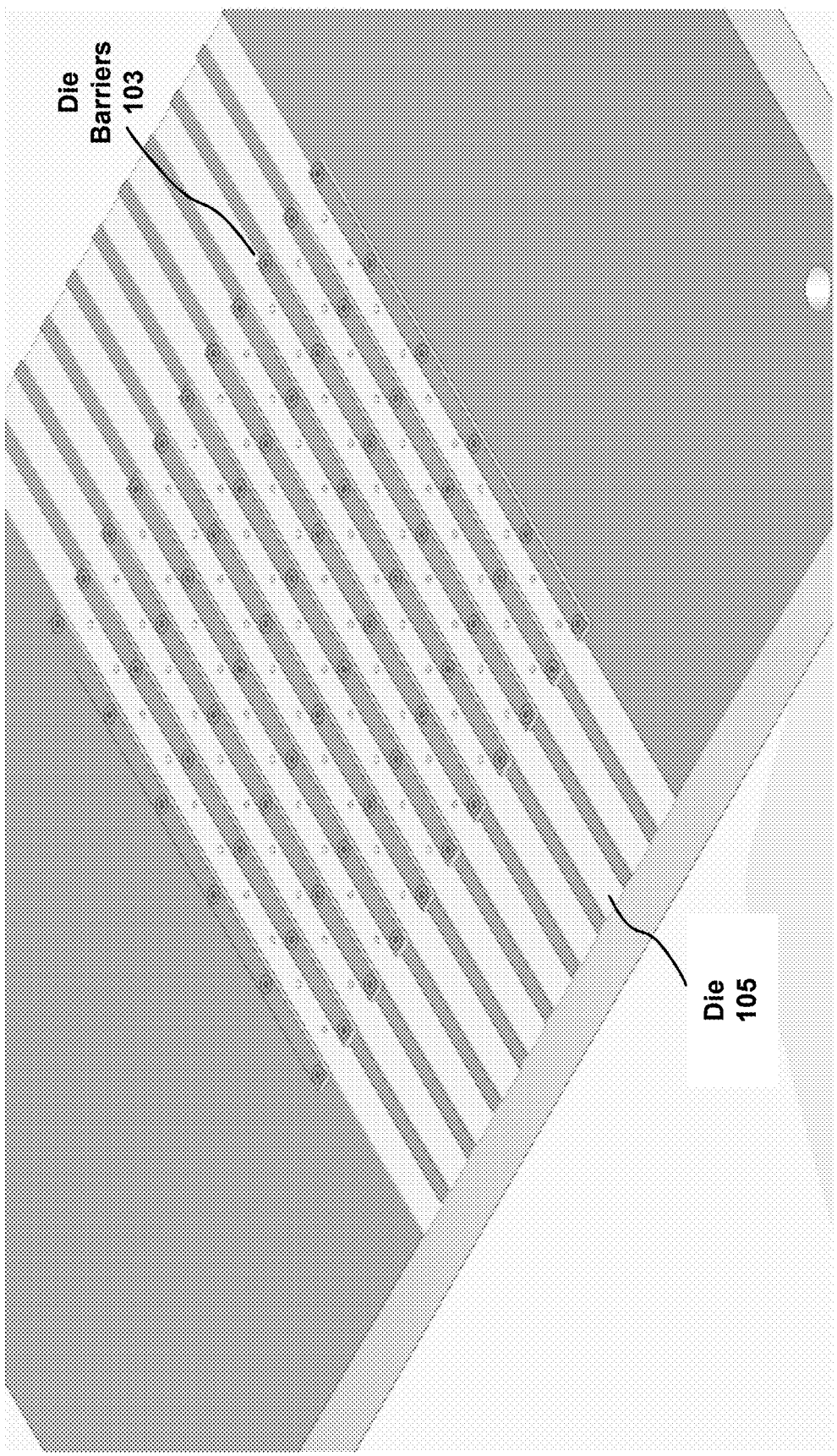
FIG. 6(A), and FIG. 6(B) are schematic diagrams illustrating die and barriers which secure test sample during small punch testing according to aspects of the present disclosure.
Figure 6B:
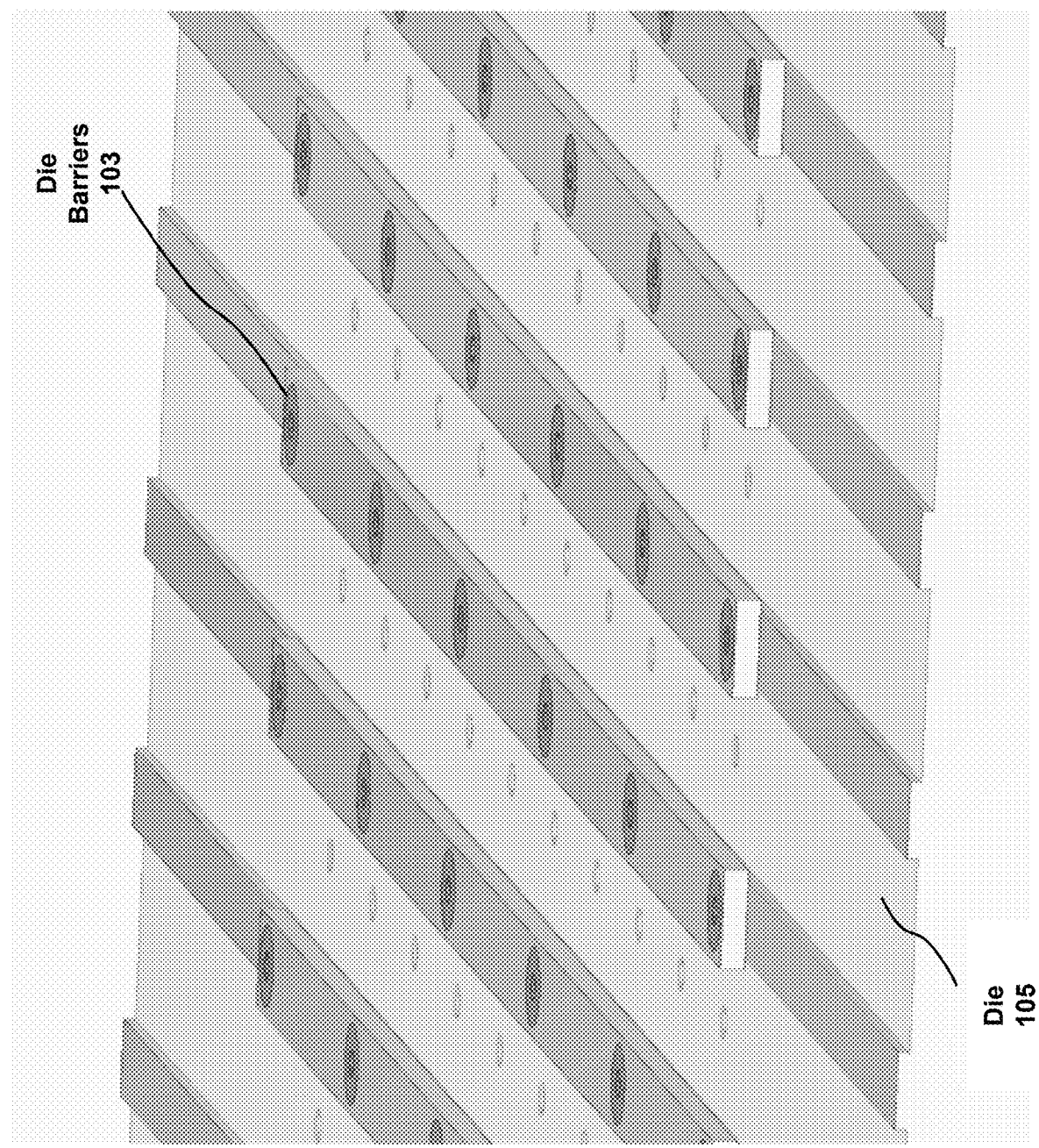

FIG. 6(A) and FIG. 6(B) are schematic diagrams illustrating die and barriers which secure test sample during small punch testing according to aspects of the present disclosure. With reference to these figures, it will be appreciated that test samples (not specifically shown) are arranged on die 105 in-between die barriers 103. Since one aspect of the apparatus according to the present disclosure provides small punch testing of very small samples, those skilled in the art will appreciate that such very small samples may become affixed to the clamping punch/assembly during a punch test and inadvertently be displaced when retracting the clamping/punch assembly after performing the test. The die barriers 103 reduce inadvertent moving of tested samples post-testing to another sample location when the clamping/punch assembly is moved by providing a structure on which such an affixed tested sample may be wiped from the clamping/punch assembly.

Figure 7:
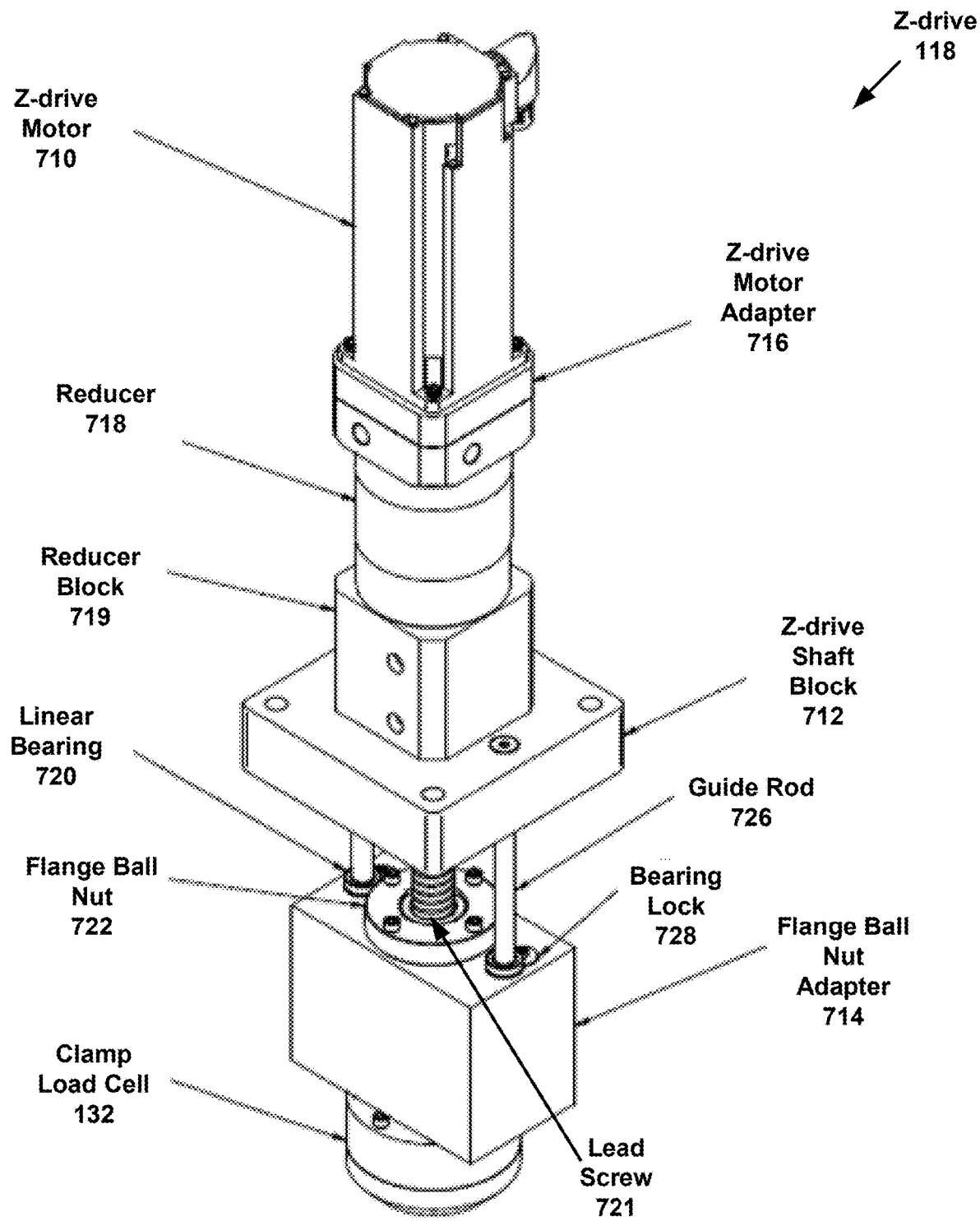
FIG. 7 is a schematic diagram showing an illustrative Z-drive assembly which operates to clamp a test sample to the die according to aspects of the present disclosure.

FIG. 7 is a schematic diagram showing an illustrative Z-drive 118 which operates to move the test drive and clamping/punch assembly (not specifically shown in this figure) to clamp a test sample to a die according to aspects of the present disclosure. As shown in this figure, illustrative parts of such Z-drive may include a Z-drive motor 710 which operates to turn a lead screw 721 resulting in a Z-axis translation of flange ball nut adapter 714, Z-axis clamp/load cell 132, and a push plate (not specifically shown in this figure) in contact with the clamp/load cell 132.

In this illustrative configuration, a Z-drive motor adapter 716 mechanically couples the Z-drive motor 710 to a reducer 718, which in turn is coupled to a reducer block 719. The reducer 718 may be configured to provide a suitable gear reduction between the Z-drive motor 710 and the lead screw 721. The reducer block 719 provides a mechanical coupling between the reducer 718 and Z-drive shaft block 712.

The Z-drive shaft block 712 is mounted to the top plate 108 (not shown in this figure). When the Z-drive motor 710 is operated, lead screw 721 is rotated resulting in a Z-axis translation of the flange ball nut adaptor 714 which slides on guide rod(s) 726. A low friction operation between guide rod 726 and flange ball nut adapter 714 is provided by a linear bearing 720, that is secured in the flange ball nut adapter 714 by bearing lock 728. A flange ball nut 722 provides low friction mechanical coupling between the lead screw 721 and the flange ball nut adapter 714.

The clamp load cell 132 provides load force data of clamping occurring between clamping/punch assembly (not shown in this figure) and a test sample.

Figure 8:
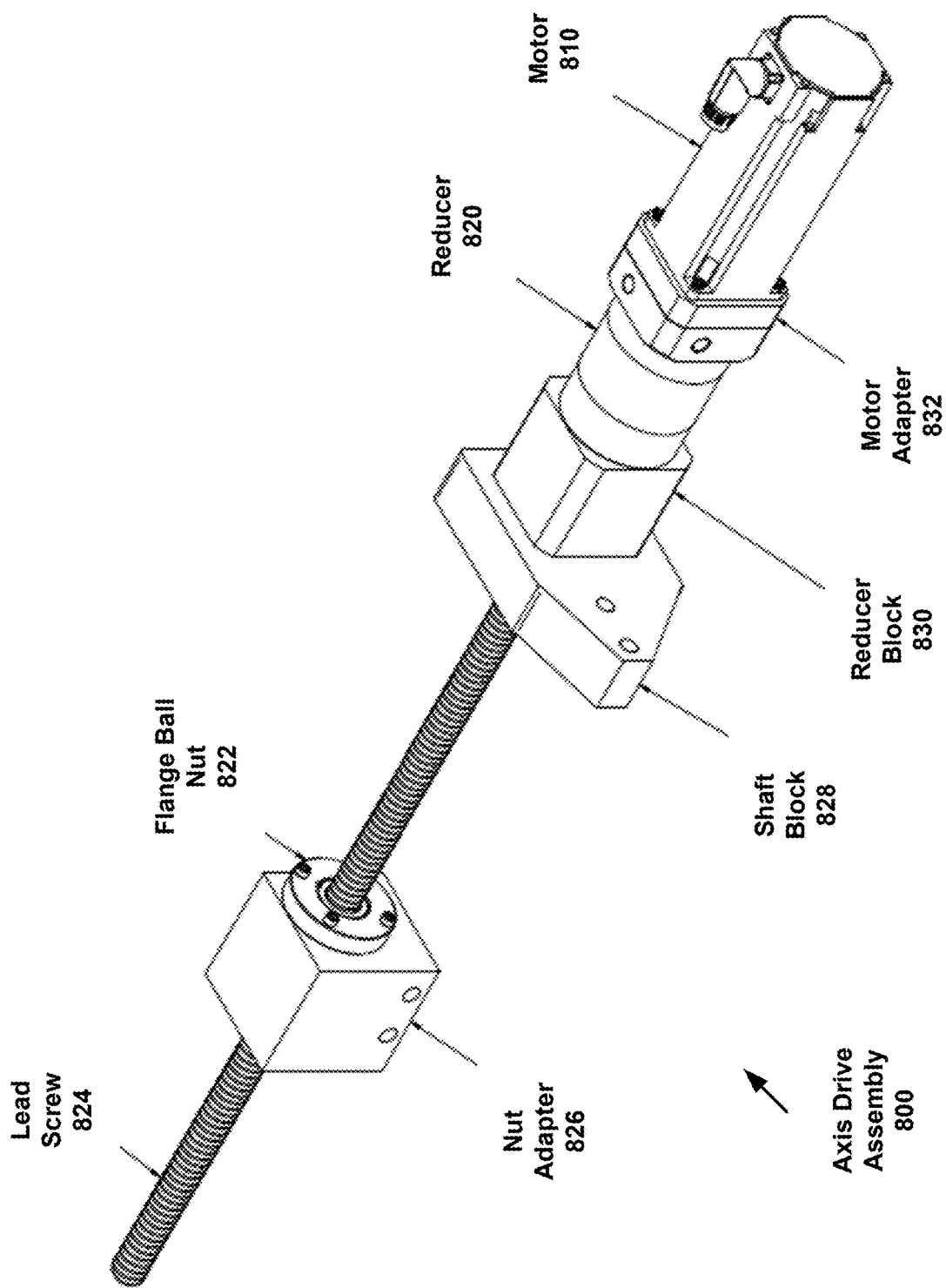
FIG. 8 is a schematic diagram showing an illustrative axis drive assembly which operates to translate the clamping/punch assembly to a location over a test sample positioned on the die according to aspects of the present disclosure.

FIG. 8 is a schematic diagram showing an illustrative axis drive assembly 800 which operates to translate the mounting carriage (FIGS. 2-155) carrying the test drive (FIGS. 2-122) and clamping/punch assembly (FIGS. 2-150) such that the clamping/punch assembly is positioned above a test sample positioned on the die (not specifically shown in this figure) according to aspects of the present disclosure. Such an illustrative axis drive assembly 800 may be employed to individually drive an X-axis and a y-axis.

As illustratively shown, a motor 810, is mechanically coupled to a lead screw 824 by a motor adapter 832, reducer 820, and reducer block 830. Reducer 820 may be configured to provide a gear reduction between the motor 810, and the lead screw 824. The reducer block mechanically couples the reducer 820 to shaft block 828. When the motor 810 is operated, the lead screw 824 rotates and nut adapter 826 translates along the length of the lead screw 824. A flange ball nut 822, provides a low friction mechanical coupling between the lead screw 824 and the nut adapter 826. The nut adapter 826 is mechanically connected to the mounting carriage (FIGS. 2-155), which translates with the nut adapter 826 translation. The axis drive assembly 800 is mounted to rail plate (FIGS. 1-104) by shaft block 828.

Figure 9:
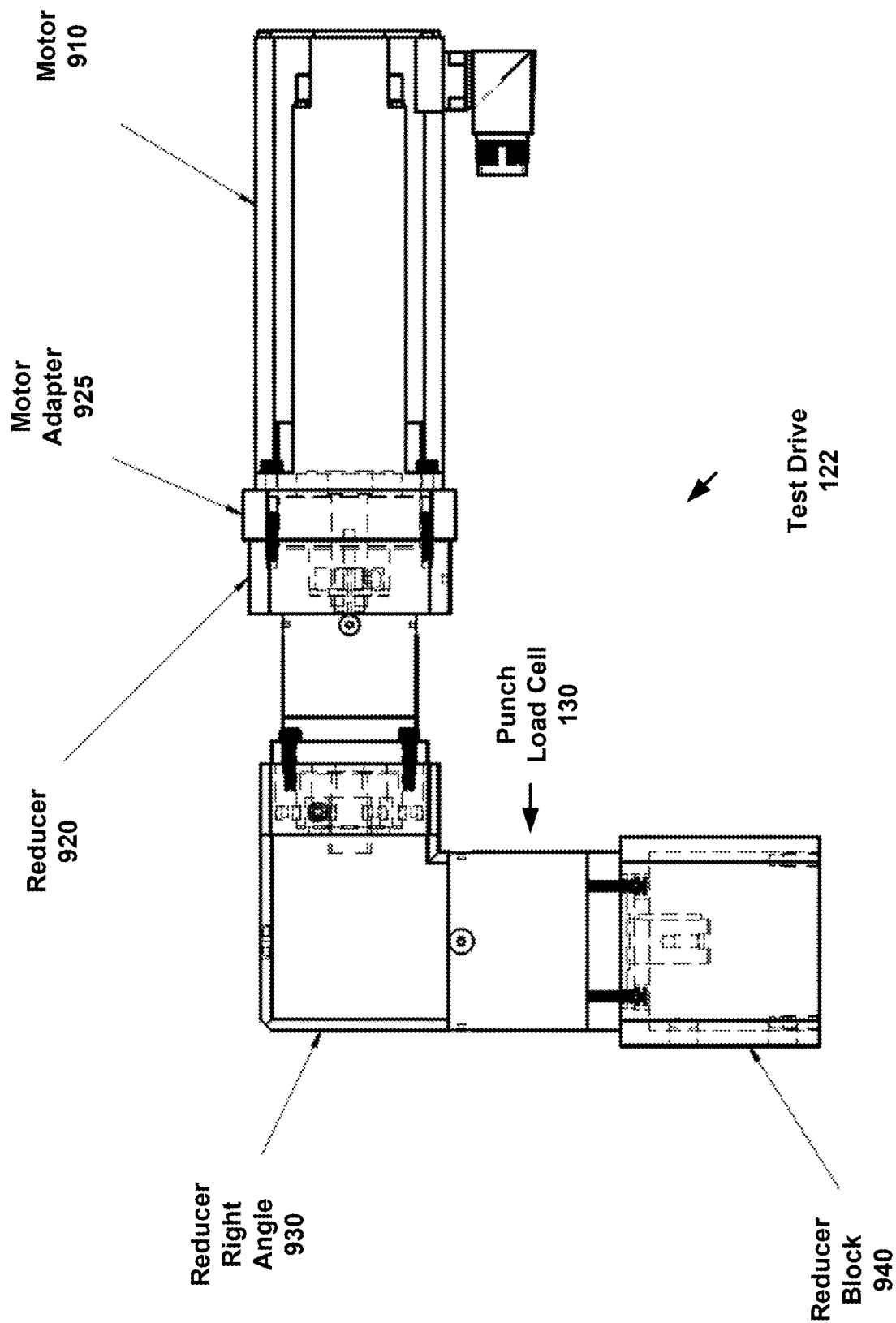
FIG. 9 is a schematic diagram showing an illustrative test drive right angle assembly which operates to urge a punch into a test sample positioned on the die according to aspects of the present disclosure.

FIG. 9 is a schematic diagram showing an illustrative test drive 122 which operates to urge a punch into a test sample positioned on the die according to aspects of the present disclosure. As shown in this figure, an illustrative test drive 122 may include motor 910, motor adapter 925, reducer 920, reducer right angle 930, and reducer block 940. The motor adapter 925 provides mechanical connection between the motor 910 and the reducer 920 which may be configured to provide a gear reduction to the motor. The reducer 920 is mechanically coupled to reducer right angle 930, which is coupled to punch load cell 130 that is further coupled to reducer block 940.

Figure 10:
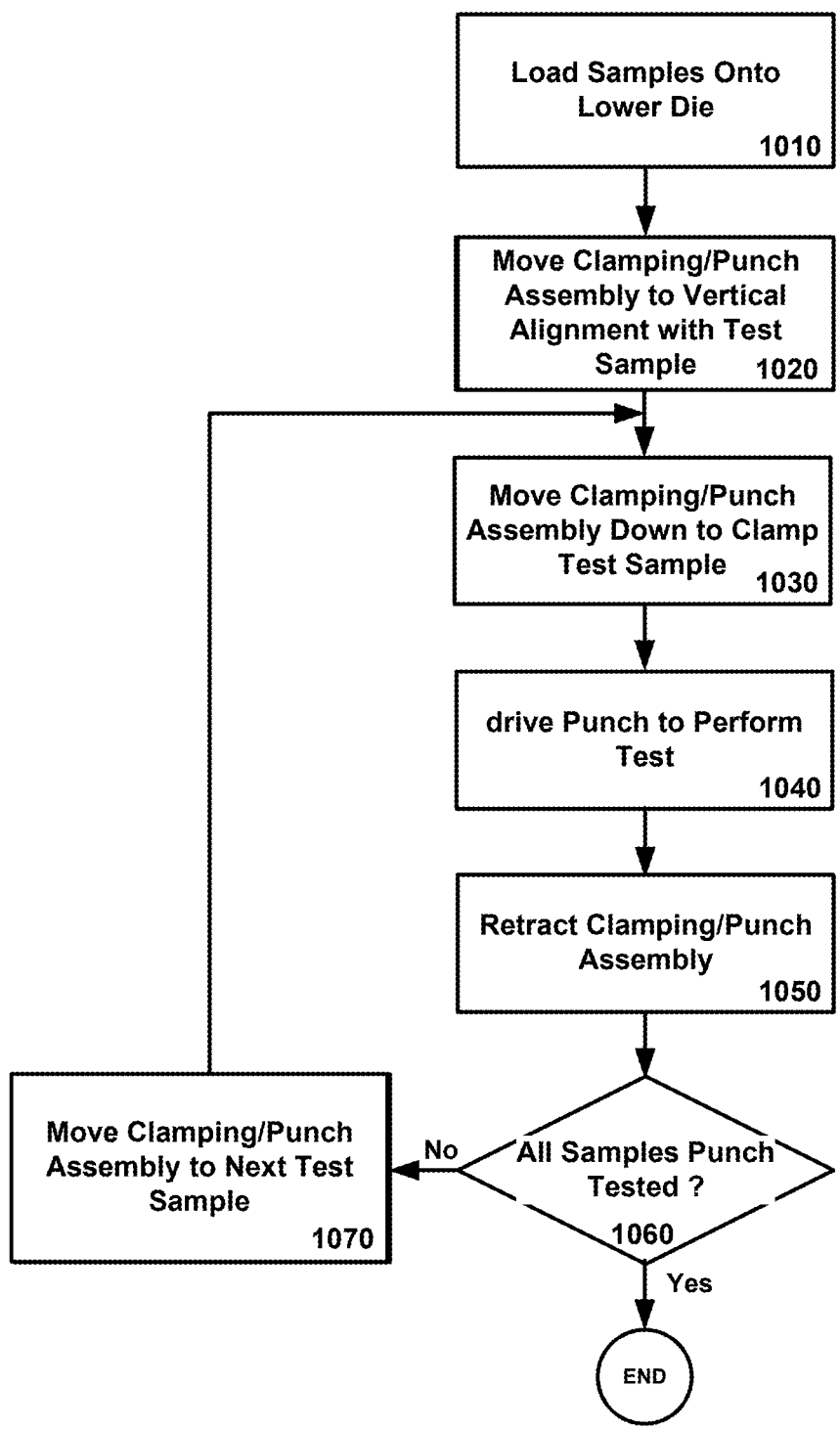
FIG. 10 is a flow diagram showing illustrative small punch test operational steps according to aspects of the present disclosure.

FIG. 10 is a flow diagram showing illustrative small punch test operational steps according to aspects of the present disclosure. With reference to this figure, a small punch test operation includes loading samples onto the die (Block 1010). Once loaded, the clamping/punch assembly is moved via operation of the X-drive and the Y-drive, to align vertically with a test sample (Block 1020). After vertical alignment of the clamping/punch assembly with test sample is achieved, the clamping/punch assembly is moved down via operation of the Z-drive to clamp the test sample to the die (Block 1030). As noted previously, the clamping of the test sample to the die may be performed while simultaneously monitoring clamping load pressure as measured by clamp load cell. After clamping, the punch is driven by operating the punch drive to perform the test on the test sample (Block 1040). After the test, the clamping/punch assembly is retracted (Block 1050), and a determination is made whether all samples loaded have been punch tested (Block 1060). If all samples loaded have been punch tested, then the testing ends. If any samples loaded remain untested, then the clamping/punch assembly is moved to the next test sample (Block 1070) and the process repeats (Block 1030).

Figure 11:
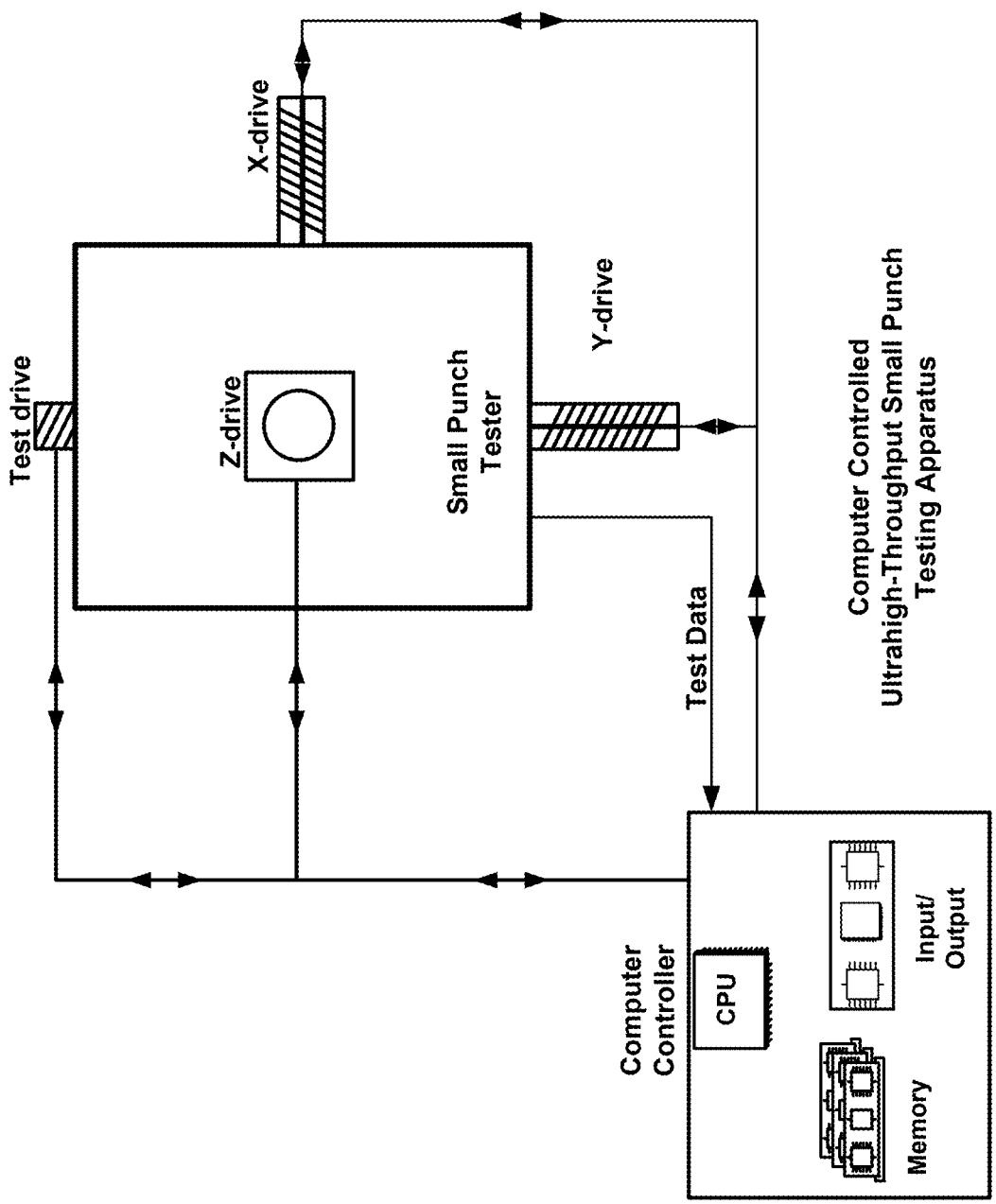
FIG. 11 is a schematic diagram showing an illustrative fully automated, computer controlled, ultrahigh-throughput small punch testing apparatus according to aspects of the present disclosure.

FIG. 11 is a schematic diagram showing an illustrative fully automated, computer-controlled, ultrahigh-throughput, small punch testing apparatus according to aspects of the present disclosure. As illustratively shown in this figure, a small punch tester according to the present disclosure including Z-drive, X-drive, Y-drive, and test drive are shown to operate under computer control. In this arrangement, each of the individual axial drives are controlled by the computer to locate/clamp/punch/relocate/repeat the testing operations while collecting test data that may include load force(s) applied for clamping and punching in addition to any deflection data that may be produced by displacement measurements performed during the testing. As may be appreciated, such computer-controlled operation may perform the operational steps outlined in FIG. 10 and perform a complete set of tests on many samples without human intervention.

At this point, while we have presented this disclosure using some specific examples, those skilled in the art will recognize that our teachings are not so limited. Accordingly, this disclosure should only be limited by the scope of the claims attached hereto.

The invention claimed is:

1. An ultrahigh-throughput small punch test apparatus comprising:
   a frame supporting:
      a die onto which is positioned one or more test samples;
      a clamping/punch assembly including an internal punch, operable to clamp one of the test samples to the die and punch test the clamped test sample;
      a Z-drive, operable to move the clamping/punch assembly in a Z-axis direction such that the clamping/punch assembly clamps the test sample to the die;
      an X-drive, operable to move the clamping/punch assembly in an X-axis direction;
      a Y-drive, operable to move the clamping/punch assembly in a Y-axis direction; and
      a test drive, operable to drive the internal punch in a Z-axis direction and punch the clamped test sample.

2. The small punch test apparatus according to claim 1 wherein the test drive and the Z-drive operate independently of one another.

3. The test apparatus of claim 2 wherein the test driver is mechanically coupled to the clamping/punch assembly.

4. The test apparatus of claim 3 further comprising a mounting carriage mechanically coupled to the clamping/punch assembly and the test driver, the mounting carriage configured to be driven in the X-axis direction by operation of the X-drive, driven in the Y-axis by operation of the Y-drive, and driven in the Z-axis direction by operation of the Z-drive.

5. The test apparatus of claim 4 further comprising a rail plate, slidably attached to the frame and configured to move in the Z-axis direction by operation of the Z-drive, the rail plate mechanically coupled to the mounting carriage.

6. The test apparatus of claim 5 further comprising a push plate, slidably attached to the frame and mechanically coupled to the rail plate by a plurality of push rods, the push plate configured to move in the Z-axis direction by operation of the Z-drive.

7. The test apparatus of claim 6 further comprising a clamp load cell, mechanically coupled to the Z-drive, and configured to measure a load imparted along the Z-axis resulting from operation of the Z-drive.

8. The test apparatus of claim 7 further comprising a punch load cell mechanically coupled to the test drive and configured to measure load imparted along the Z-axis resulting from operation of the test drive.

9. The test apparatus of claim 1 further comprising a linear variable differential transformer (LVDT) configured to measure linear displacement of the internal punch during punch testing.

10. The test apparatus of claim 9 wherein the LVDT is mechanically mounted to the clamping/punch assembly.

11. A method of performing ultrahigh-throughput small punch testing comprising:
    (a) providing a small punch test apparatus including
       a die onto which is positioned one or more test samples;
       a clamping/punch assembly including an internal punch, operable to clamp one of the test samples to the die and punch test the clamped test sample;
       a Z-drive, operable to move the clamping/punch assembly in a Z-axis direction such that the clamping/punch assembly clamps the test sample to the die;
       an X-drive, operable to move the clamping/punch assembly in an X-axis direction;
       a Y-drive, operable to move the clamping/punch assembly in a Y-axis direction; and
       a test driver, operable to drive the internal punch in a Z-axis direction and punch the clamped test sample;
    (b) locating the clamping/punch assembly over one of the test samples positioned onto the die;
    (c) operating the Z-drive to clamp the test sample over which the clamping/punch assembly is located such that the test sample over which the clamping/punch assembly is located is clamped to the die; and
    (d) operating the test drive to drive the internal punch in a Z-axis direction and punch test the clamped test sample.

12. The method according to claim 11 further comprising:
    (e) operating the Z-drive to retract the clamping/punch assembly from the clamped test sample.

13. The method according to claim 12 further comprising:
    (f) determining if all the test samples have been punch tested.

14. The method according to claim 13 further comprising:
(g) based upon the determination if all the test samples have been punch tested, locating the clamping/punch assembly over another one of the test samples positioned onto the die, and repeating (b)-(f) above, until all the test samples positioned onto the die are punch tested.

15. The method according to claim 11 wherein the Z-drive is operated to clamp the test sample at a pre-determined clamping force.

16. The method according to claim 15 wherein the pre-determined clamping force is measured by a load cell, and the pre-determined clamping force is maintained during a subsequent punch test.

17. The method according to claim 11 wherein the clamping/punch is located over one of the test samples positioned onto the die by operating the X-drive and/or Y-drive.

18. The method according to claim 17 further comprising measuring a punch force produced by the test driver by a load cell.

19. The method according to claim 18 further comprising measuring a linear displacement of the punch during punch testing.

20. The method according to claim 19 further comprising storing the measured clamping force, the measured punch force, and the measured linear displacement of the punch and reporting the measured stored forces and measured linear displacement.

* * * * *